United States Patent [19]

Ferlin

[11] Patent Number: 4,823,838
[45] Date of Patent: Apr. 25, 1989

[54] OUTDOOR GAS COOKING APPLIANCE

[75] Inventor: William J. Ferlin, Plymouth, Mich.

[73] Assignee: Lincoln Brass Works, Inc., Detroit, Mich.

[21] Appl. No.: 188,746

[22] Filed: Apr. 29, 1988

Related U.S. Application Data

[63] Continuation of Ser. No. 920,233, Nov. 13, 1986, abandoned.

[51] Int. Cl.⁴ .............................................. F16K 31/48
[52] U.S. Cl. ........................ 137/624.12; 137/624.21; 251/74
[58] Field of Search .................. 137/624.11, 624.12, 137/624.21, 624.22; 251/174

[56] References Cited

U.S. PATENT DOCUMENTS

| Re. 26,747 | 12/1969 | Draghi | 74/3.54 |
|---|---|---|---|
| 2,012,532 | 8/1935 | Grayson et al. | 137/624.12 |
| 2,554,260 | 5/1951 | Mueller | 137/624.11 |
| 2,626,661 | 1/1953 | McDowell | 431/15 |
| 2,689,006 | 9/1954 | Lindsay | 137/624.11 X |
| 2,810,435 | 10/1957 | Demi et al. | 137/624.11 |
| 3,107,539 | 10/1963 | Cairelli | 74/3.54 |
| 3,241,870 | 3/1966 | Cairelli | 292/144 |
| 3,358,092 | 12/1967 | Clark et al. | 200/38 |
| 3,385,115 | 5/1968 | Draghi et al. | 74/3.54 |
| 3,582,580 | 6/1971 | Draghi | 200/38 |
| 3,591,956 | 7/1971 | Draghi | 58/21.13 |
| 3,879,587 | 4/1975 | Draghi | 200/35 R |
| 4,329,138 | 5/1982 | Riordan | 431/90 |
| 4,524,250 | 6/1985 | Laviana | 200/33 R |
| 4,593,676 | 6/1986 | Wackerman | 126/41 R |
| 4,593,677 | 6/1986 | Sargunam | 126/214 C |
| 4,690,170 | 9/1987 | Tsai et al. | 137/624.11 |

Primary Examiner—Samuel Scott
Assistant Examiner—Allen J. Flanigan

[57] ABSTRACT

There is disclosed a semiautomatic timed shut-off valve assembly adapted for use in a gas grill including a normally closed supply valve for supplying gas to one or more manual flow control valves, a manual valve opening member for actuating said supply valve to an opened position, and a timer for causing said supply valve to remain in an open position for a variable preset time. Also disclosed is an arrangement for manually overriding the timer to permit the supply valve to remain open for an indefinite time period.

3 Claims, 3 Drawing Sheets

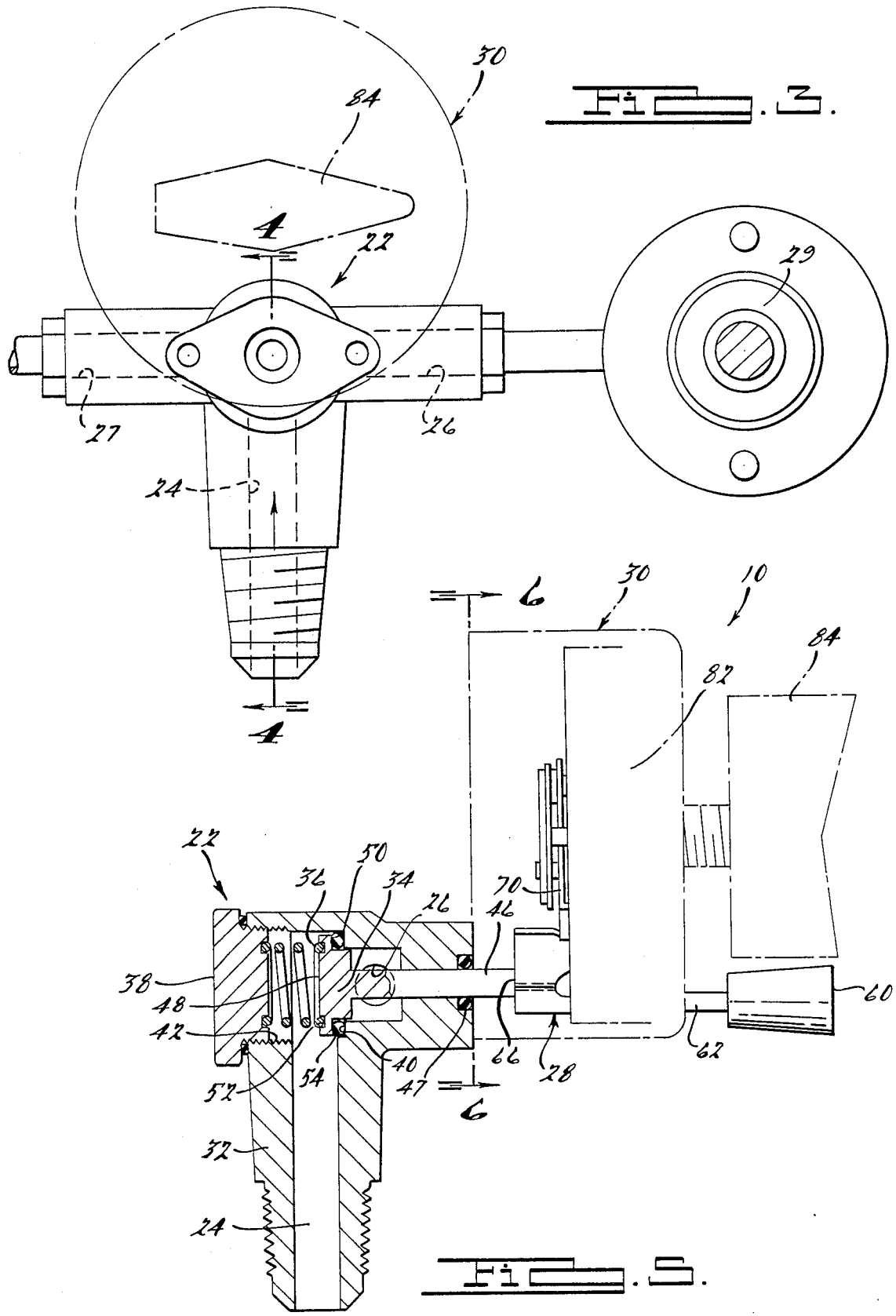

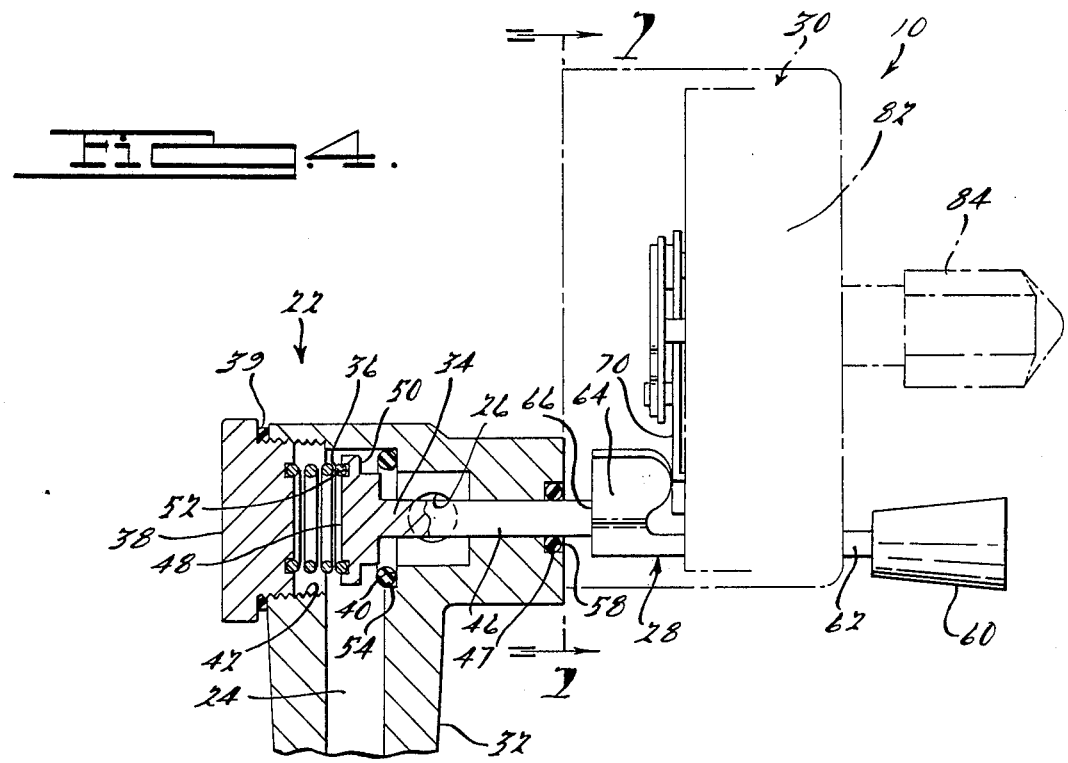
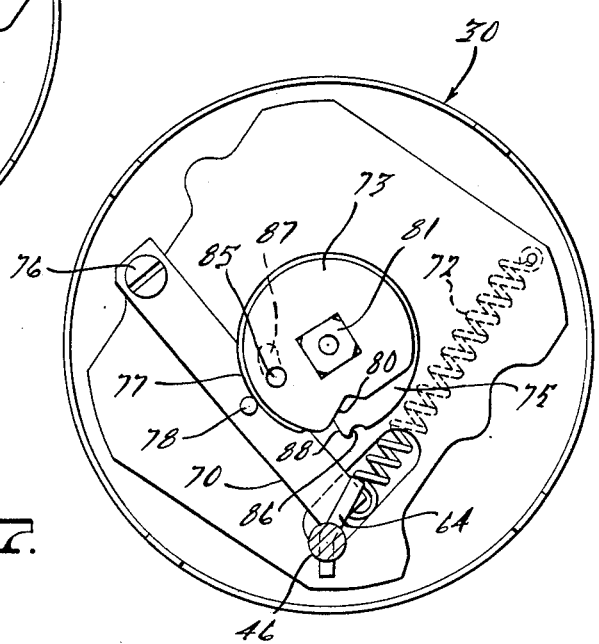

4,823,838

OUTDOOR GAS COOKING APPLIANCE

This is a continuation of U.S. patent application Ser. No. 930,233, filed Nov. 13, 1986, abandoned.

BACKGROUND AND SUMMARY OF THE INVENTION

The present invention relates generally to a timed shut-off valve to be used in propane or natural gas fueled burners and more particularly to an automatic shut-off valve for timed gas shut-off valve for use in a gas grill.

Conventional valves of outdoor gas grills may be turned on or off by actuating a single valve knob. These valves can be easily turned on by children playing around the barbecue. In addition, the conventional valves will remain on if left unattended until the gas runs out or the value is manually turned off. Thus, conventional valves, which are left on are wasteful of gas and may create an over heated grill condition, both of which are undesirable.

It is an object of the present invention to provide a valve for a gas grill which requires a two step process for opening of the valve, which discourages use of the valve by children.

It is further object of the present invention to provide a valve for a gas grill which will shut itself off if left unattended for a predetermined time.

It is a further object of the present invention to provide a manual override in an automatic shut-off valve assembly for use of the gas grill for extended periods of time.

The present invention provides a semiautomatic timed shut-off valve assembly adapted for use in a gas barbecue which comprises closed biased valving means which includes gas inlet and gas outlet means. A manual valve opening means is provided for opening the closed biased valve means into a valve opened operational position. A timed engaging means is provided for engaging and retaining the closed biased valving means in the open position for a variable preset time and thereafter releasing the closed biased valving means upon completion of the variable preset time resulting in shutting the burner assembly off.

Additional advantages and features of the present invention will become apparent from the subsequent description and the appended claims taken in conjunction with the accompanying drawings.

BRIEF DESCRIPTION OF THE DRAWINGS

FIG. 3 is a front elevational view, partially in phantom, of the shut-off valve of the present invention;

FIG. 4 is a vertical sectional view, partially in phantom, taken along line 4—4 in FIG. 3, and shown the shut-off valve in the valve-opened position;

FIG. 5 is a view similar to FIG. 4 showing the shut-off valve in the valve-closed position;

FIG. 6 is a rear elevational view looking along line 6—6 in FIG. 5 showing the timer assembly in the valve-closed position;

FIG. 7 is a view similar to FIG. 5 showing the timer assembly in the valve-opened position.

DESCRIPTION OF THE PREFERRED EMBODIMENT

Figure 1:
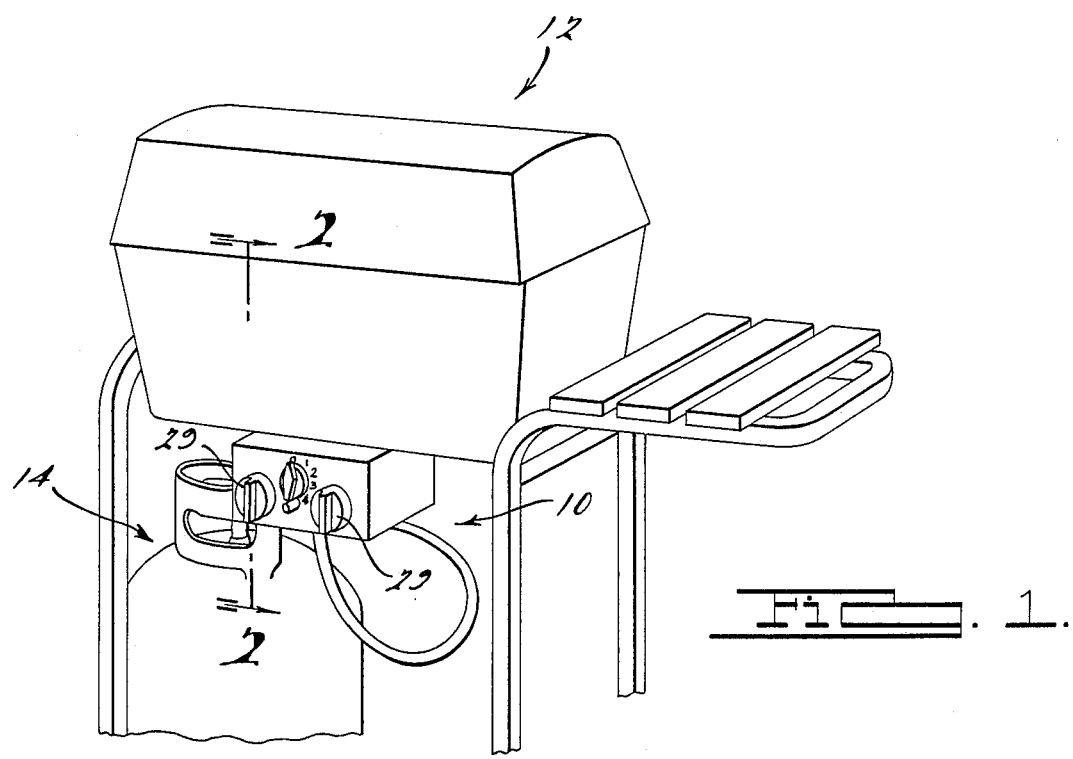
FIG. 1 is a perspective view of a gas barbecue incorporating the shut-off valve of the present invention.
Figure 2:
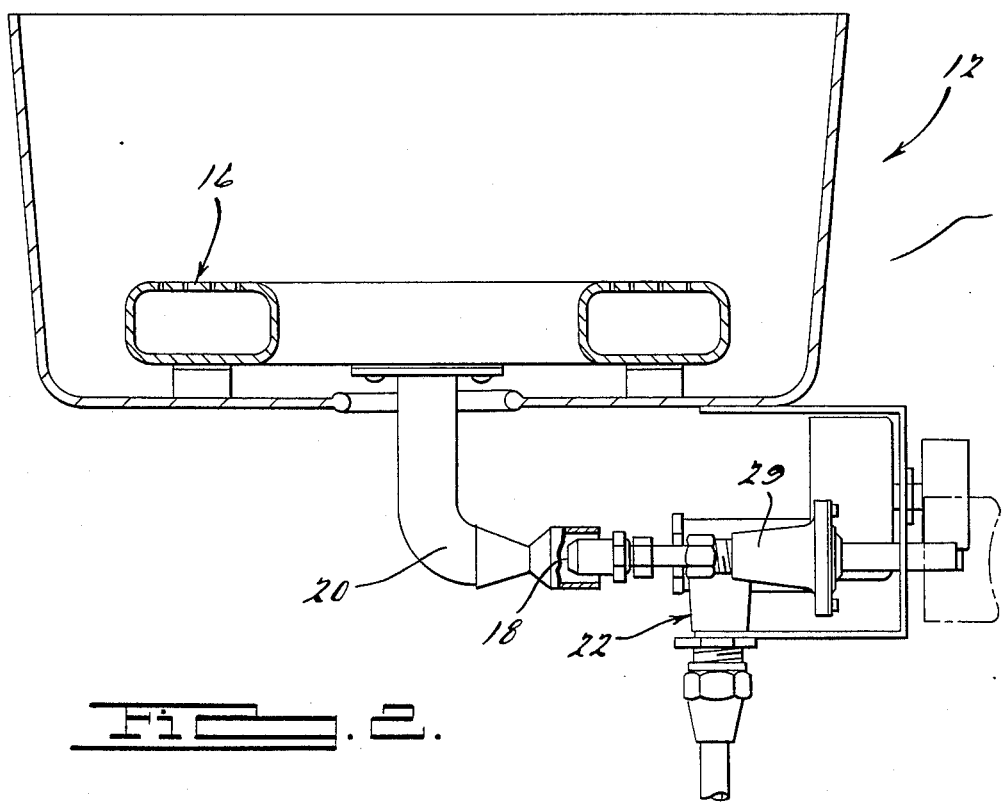
FIG. 2 is a vertical sectional view taken along line 2—2 in FIG. 1.

Referring now to the drawings, a shut-off valve assembly, generally indicated at 10, is shown adapted for use in a conventional gas barbecue 12 having a fuel source 14. Shut-off valve assembly 10 has manually controlled flow control valves 29 connected respectively, by orifices 18 to venturi tubes 20 which lead to burner 16, as is normal in most gas grills. Shut-off valve 10 includes a unique normally-closed valve 22 for controlling the gas supply to flow control valves 29. As shown in FIGS. 3–5, valve 22 includes a fuel inlet passage 24 which connects to the fuel supply 14 and transverse fuel outlet passages 26 and 27 which are connected to control valves 29. A timer 30 is provided for retaining the shut-off valve in an open position and allowing the valve to return to the closed position after a preset variable time.

FIGS. 4 and 5 show valve 22 in its respective open and closed positions. Valve 22 includes a valve body 32 and a valve element 34. Valve body 32 includes inlet passage 24 and transverse outlet passages 26 and 27. Valve element 34 is operatively positioned between passage 24 and outlet passages 26 and 27 for operatively shutting off or opening the flow of fuel through the latter. A manual valve actuator 28 is provided for actuating valve member 34 into its opened position. Valve actuator 28 is configured in such a manner that the valve member 34 may be locked in its open position for a predetermined period of time and thereafter released.

Valve body 32 includes a threaded bore 42 for facilitating assembly and maintenance of valve element 34. Bore 42 is capped by cap member 38 and a sealing gasket 39. A compression spring 36 is positioned between an annular groove 52 in the end face 48 of valve element 34 and cap 38 to bias valve element 34 into the closed position. Valve element 34 has an actuating shaft 46 which passes through the valve body and is sealed with respect thereto by on O-ring 47. Valve element 34 has an annular surface 54 on which is disposed an O-ring adapted to sealingly engage a valve seat 40 in valve body 32, to block the flow of gas from passage 24 to passages 26 and 27.

Shut-off valve 22 is manually opened by inward pressure from an actuator 28 having at one end a push button 60 connected by an intermediate stem 62 to a tang 64 having an end surface 66 engaging the free end of shaft 46.

Timer 30 includes a timer mechanism 82 actuated by a manual timer handle 84. Timer mechanism 82 operates such that when push button 60 is moved inwardly to open valve 22 and handle 84 is turned from its off position in a first direction to set the timer, a locking arm 70 is moved into a position in aligment with tang 64 thereby holding actuator 28 and valve 22 in the open position. Timer mechanism 82 runs for a preset time until arm 70 is retracted thus releasing actuator 28 and allowing valve 22 to return to the closed position. The timer mechanism 82 is similar to those disclosed in U.S. Pat. Nos. 3,879,587 and 2,261,989 and the disclosures of these patents are hereby incorporated herein by reference. Other timers readily known to those skilled in the art may also be used in connection with the present invention.

The operation of locking arm 70 is more particularly shown in FIGS. 6 and 7. The locking arm 70 is pivoted about a fastener 76 by camming an actuating pin 78 thereon. Arm 70 is normally biased away from tang 64 of actuator 28 by a tension spring 72, and is moved into position for locking valve 22 in the valve-open position by movement of circular cams 75 and 73 in the following manner. Cam 73 is connected to timer handle 84 and the interval timer mechanism by a shaft 81. Cam 73 is operatively connected to cam 75 by a lost motion device including a pin 85 projecting from cam 73 into a slot 87 in cam 75. Cam 73 includes a camming surface 80 for camming the actuation pin 78 outwardly to a valve-holding-open position when handle 84 is turned in a first timer setting direction. In the valve-closed condition pin 78 is disposed in a slot 79 in cam 75. Movement of cam 73 also moves pin 85 along slot 87 and provides a corresponding movement of cam 75 after pin 78 has been cammed all the way out of slot 79. Pin 78 engages then the outer surface of cam 75 as cam 73 and then cam 75 begin timed rotation in an opposite direction thereby holding pin 78 and arm 70 in alignment with tang 64 of actuating member 28, to hold valve 22 in the open position. Thereafter, when pin 78 reaches slot 79 the spring force on arm 70 causes it to move out of alignment with tang 64 as pin 78 drops into slot 79, thereby permitting spring 36 to move valve element 34 and acutator 28 outwardly and shutting off the supply of gas.

The valve assembly may also be manually actuated for an indeterminate period of time by actuating push button 60 inwardly to open valve 22 and then rotating handle 84 from its off position in an opposite non-timing direction. This movement causes pin 78 to be cammed outwardly and into engagement with notch 86, by camming surface 88, on cam 75, thus moving and holding arm 70 to a valve-holding-open position. Valve 22 stays open until handle 84 is manually rotated in an opposite direction back to its off position and moving pin 78 out of engagement with notch 86. Spring 72 is then free to move arm 70 to its valve-closed position, thereby allowing valve element 34 to close.

As can be visualized rotation of handle 84 cannot be accomplished unless push button 60 is manually actuated inwardly due to the fact that the side of tang 64 blocks movement of arm 70 when actuator 28 is in its valve-off position.

While it will be apparent that the preferred embodiment the invention disclosed is well calculated to provide the advantages and features above stated, it will be appreciated that the invention is susceptible to modification, variation and change without departing from the proper scope or fair meaning of the subjoined claims.

What is claimed is:

1. A semiautomatic timed shut-off valve assembly adapted for use in a gas grill, comprising:
    normally closed valve means including fuel inlet means and fuel outlet means, said fuel outlet means being connected to a valve for controlling fuel flow to a gas burner;
    a first manually actuatable actuator for opening said valve means, said first actuator including a tang portion extending transversely therefrom;
    a second separate manually actuatable actuator spaced from said first actuator; and
    a timed means being actuatable by said second actuator, said timed means including a pivotal arm, said tang portion including a surface thereon for engagement with said pivotal arm, said pivotal arm being pivoted for engaging said surface of said tang portion for causing said valve means to remain in said open position for a variable preset time and for thereafter releasing said first actuator to permit said valve means to close, said second actuator being actuatable only after the actuation of said first actuator, said second actuator actuating said timed means when actuated in a first direction, and retaining said valve in an open position indefinitely when actuated in a second direction.

2. The semiautomatic shut-off valve of Claim 11 wherein the first manually actuatable actuator actuates said valve in a first direction and said pivotal arm pivots in a plane substantially perpendicular to said first direction for engaging said surface of said first manually acutatable actuator.

3. A semiautomatic timed shut-off valve assembly adapted for use in a gas grill, comprising:
    normally closed valve means including fuel inlet means and fuel outlet means, said fuel outlet means being connected to a valve for controlling fuel flow to a gas burner;
    a first manually actuatable actuator for opening said valve means said first manually actuatable actuator including a tang portion extending transversely therefrom, said tang portion having an arcuate surface;
    a second separate manually actuatable actuator spaced from said first actuator; and
    a timed means being actuatable by said second actuator, said timed means including a pivotal arm being pivoted for engaging said arcuate surface of said first actuator for causing said valve means to remain in said open position for a variable preset time and for thereafter releasing said first actuator to permit said valve means to close, said arcuate surface allowing for easy disengagement of said pivotal arm from said tang, said second actuator being actuatable only after the actuation of said first actuator, said second actuator actuating said timed means when actuated in a first direction, and retaining said valve in an open position indefinitely when actuated in a second direction.

* * * * *

UNITED STATES PATENT AND TRADEMARK OFFICE
CERTIFICATE OF CORRECTION

PATENT NO. : 4,823,838

DATED : April 25, 1989

INVENTOR(S) : William J. Ferlin

It is certified that error appears in the above-identified patent and that said Letters Patent is hereby corrected as shown below:

Column 1, line 27, after "is" insert -- a --.

Column 4, line 22, Claim 2, "11" should be -- 1 --.

Signed and Sealed this

Twenty-seventh Day of February, 1990

*Attest:*

JEFFREY M. SAMUELS

*Attesting Officer*     *Acting Commissioner of Patents and Trademarks*